(12) United States Patent
Larson-Smith et al.

(10) Patent No.: US 9,403,992 B2
(45) Date of Patent: Aug. 2, 2016

(54) BARRIER COATINGS FOR POLYMERIC SUBSTRATES

(71) Applicant: The Boeing Company, Chicago, IL (US)

(72) Inventors: Kjersta L. Larson-Smith, Seattle, WA (US); Shawn M. Pare, Woodinville, WA (US); Vasan S. Sundaram, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 442 days.

(21) Appl. No.: 14/078,615

(22) Filed: Nov. 13, 2013

(65) Prior Publication Data

US 2014/0065395 A1 Mar. 6, 2014

Related U.S. Application Data

(60) Division of application No. 13/013,499, filed on Jan. 25, 2011, now Pat. No. 8,603,592, which is a continuation of application No. 11/680,512, filed on Feb. 28, 2007, now Pat. No. 7,878,054.

(51) Int. Cl.
| | |
|---|---|
| *B64C 1/14* | (2006.01) |
| *B05D 7/04* | (2006.01) |
| *C09D 5/00* | (2006.01) |
| *B05D 7/00* | (2006.01) |

(Continued)

(52) U.S. Cl.
CPC .. *C09D 5/00* (2013.01); *B05D 7/04* (2013.01); *B05D 7/57* (2013.01); *B64C 1/1484* (2013.01); *B64F 5/0045* (2013.01); *C08J 7/045* (2013.01); *B05D 1/62* (2013.01); *C08J 2333/06* (2013.01); *C08J 2369/00* (2013.01); *C08J 2483/04* (2013.01); *Y10T 428/24802* (2015.01); *Y10T 428/24851* (2015.01); *Y10T 428/24917* (2015.01); *Y10T 428/24975* (2015.01); *Y10T 428/24983* (2015.01); *Y10T 428/265* (2015.01); *Y10T 428/31504* (2015.04); *Y10T 428/31507* (2015.04); *Y10T 428/31663* (2015.04); *Y10T 428/31935* (2015.04)

(58) Field of Classification Search
CPC .................................. B64C 1/1484; B05D 7/04
See application file for complete search history.

(56) References Cited

U.S. PATENT DOCUMENTS

| | | | | |
|---|---|---|---|---|
| 4,557,946 | A * | 12/1985 | Sacher ..................... | B05D 1/62 427/314 |
| 4,830,873 | A * | 5/1989 | Benz ....................... | B05D 1/62 427/164 |

(Continued)

FOREIGN PATENT DOCUMENTS

| | | |
|---|---|---|
| WO | 0224344 A2 | 3/2002 |
| WO | 2004076718 A1 | 9/2004 |
| WO | 2007076769 A2 | 7/2007 |

*Primary Examiner* — Liam J Heincer
(74) *Attorney, Agent, or Firm* — Christopher J. Knors; Moore & Van Allen PLLC

(57) ABSTRACT

An exemplary embodiment provides coated polymeric substrates that have a polymeric substrate body with a coated surface. The surface coating includes more than one pair of coating layers. Each pair of coating layers includes a first applied coating layer and a second applied coating layer. In addition, an indicator, applied on top of or between coating layers, provides an indication of wear of the coating. The first and second applied coating layers have a thickness between about 3 to about 10 nanometers. The coating exhibits a Hall-Petch effect.

22 Claims, 6 Drawing Sheets

(51) Int. Cl.
    *B64F 5/00*    (2006.01)
    *C08J 7/04*    (2006.01)
    *B05D 1/00*    (2006.01)

(56) References Cited

U.S. PATENT DOCUMENTS

| | | | | |
|---|---|---|---|---|
| 4,842,941 A * | 6/1989 | Devins | B05D 1/62 | 427/162 |
| 5,190,807 A | 3/1993 | Kimock et al. | | |
| 5,228,478 A | 7/1993 | Kleisle | | |
| 5,298,587 A * | 3/1994 | Hu | C23C 16/30 | 427/489 |
| 5,344,712 A | 9/1994 | Basil et al. | | |
| 5,508,368 A * | 4/1996 | Knapp | C23C 16/0245 | 347/203 |
| 5,618,619 A * | 4/1997 | Petrmichl | B05D 1/62 | 427/527 |
| 5,641,559 A * | 6/1997 | Namiki | B05D 1/62 | 428/215 |
| 5,670,224 A * | 9/1997 | Izu | B65D 65/42 | 427/237 |
| 5,846,649 A * | 12/1998 | Knapp | B05D 1/62 | 428/334 |
| 6,110,544 A * | 8/2000 | Yang | C23C 16/402 | 204/192.38 |
| 6,155,674 A * | 12/2000 | Figueredo | B41J 2/14129 | 347/63 |
| RE37,294 E | 7/2001 | Knapp et al. | | |
| 6,376,064 B1 * | 4/2002 | Gasworth | B05D 7/52 | 427/407.1 |
| 6,468,642 B1 * | 10/2002 | Bray | B26B 21/60 | 428/216 |
| 6,541,282 B1 * | 4/2003 | Cheung | H01L 21/02208 | 257/E21.279 |
| 6,607,675 B1 * | 8/2003 | Hsieh | H01L 21/31116 | 216/67 |
| 6,818,309 B1 * | 11/2004 | Talpaert | C03C 17/22 | 428/336 |
| 6,905,773 B2 * | 6/2005 | Hein | C23C 16/401 | 428/336 |
| 6,926,926 B2 * | 8/2005 | Cho | C23C 16/325 | 118/715 |
| 6,936,309 B2 * | 8/2005 | Li | C23C 16/401 | 257/E21.277 |
| 6,943,127 B2 * | 9/2005 | Cho | C23C 16/30 | 257/E21.277 |
| 7,151,053 B2 * | 12/2006 | Lee | C23C 16/30 | 257/E21.256 |
| 7,200,460 B2 * | 4/2007 | Campana | C23C 16/36 | 257/E21.029 |
| 8,802,236 B2 * | 8/2014 | Larson-Smith | B64C 1/1484 | 428/212 |
| 2003/0068534 A1 * | 4/2003 | Ohkawa | C08J 7/06 | 428/701 |
| 2003/0157345 A1 * | 8/2003 | Beldi | B05D 1/62 | 428/447 |
| 2004/0022951 A1 | 2/2004 | Maurus | | |
| 2004/0054044 A1 | 3/2004 | Bittner et al. | | |
| 2004/0062873 A1 | 4/2004 | Jung et al. | | |
| 2004/0076837 A1 * | 4/2004 | Hein | C23C 16/401 | 428/446 |
| 2004/0180210 A1 * | 9/2004 | Vissing | B05D 1/62 | 428/421 |
| 2005/0139966 A1 * | 6/2005 | Scarlete | C23C 16/325 | 257/632 |
| 2006/0014027 A1 * | 1/2006 | Oudard | C03C 17/22 | 428/428 |
| 2006/0063015 A1 * | 3/2006 | McCormick | C23C 14/08 | 428/457 |
| 2006/0079616 A1 * | 4/2006 | Kayanoki | C09D 183/06 | 524/261 |
| 2006/0127443 A1 * | 6/2006 | Helmus | A61L 27/20 | 424/423 |
| 2006/0158101 A1 * | 7/2006 | Camilletti | H01L 51/0097 | 313/504 |
| 2007/0059616 A1 * | 3/2007 | Mishra | G03G 15/785 | 430/56 |
| 2007/0122598 A1 | 5/2007 | Coak et al. | | |
| 2007/0188871 A1 * | 8/2007 | Fleury | B32B 17/10036 | 359/586 |
| 2009/0042025 A1 * | 2/2009 | Beldi | C23C 16/0245 | 428/336 |
| 2010/0239742 A1 * | 9/2010 | Larson-Smith | B64C 1/1484 | 427/8 |
| 2010/0239870 A1 * | 9/2010 | Bowen | C09D 1/00 | 428/447 |
| 2011/0148050 A1 * | 6/2011 | Vissing | B05D 1/62 | 277/650 |

\* cited by examiner

BARRIER COATINGS FOR POLYMERIC SUBSTRATES

CROSS-REFERENCE TO RELATED APPLICATIONS

This application claims priority from and the benefit of U.S. Nonprovisional application Ser. No. 13/013,499, entitled BARRIER COATINGS FOR POLYMERIC SUBSTRATES, filed Feb. 28, 2007.

TECHNICAL FIELD

The embodiments described herein generally relate to barrier coatings for polymeric substrates and more especially to such coatings that are relatively impervious to water absorption and that have abrasion resistance.

BACKGROUND

Plastics are finding increasing use in manufactured goods. For example certain automobiles have plastic body panels, aircraft have plastic interior paneling and even exterior skin panels may be made of plastic composites. While plastics offer several excellent properties such as light weight, formability, and low cost, plastics also have significant short comings. In general, plastic surfaces are not as hard or abrasion resistant as steel surfaces, for example. Further, while some plastics may be transparent, glass which is much heavier and more expensive remains the material of choice in certain critical applications such as safety glass in automobiles and in passenger aircraft windshields.

The primary cockpit windshields in commercial airplanes are typically made of multi-pane laminated glass. Glass is used because of its strength, scratch and wiper-blade abrasion resistance, and chemical and environmental resistance. These properties insure that good vision is maintained through critical cockpit windshields, especially where wipers are used for rain removal. Glass has limitations, however, in terms of formability and is not always the lightest and/or least expensive material for windshield construction. Cockpit windshield shapes have remained virtually the same during the last several decades because of limitations in glass formability. Switching to polymeric materials, such as stretched acrylic or polycarbonate, could lead to lighter, less expensive windshields and permit greater flexibility in terms of windshield shape. Reshaping of cockpit windshields would lead to improved airplane cab aerodynamics with associated aero-drag reduction and hence improved airplane fuel efficiency. Improved cockpit aerodynamics would also lead to reduced exterior noise generation and hence might lower internal cabin noise levels. Reduced noise levels may make airplane travel more comfortable to the flight crew and passengers.

Aircraft passenger windows, on the other hand, unlike passenger aircraft windshields, are typically made of stretched acrylic (i.e. acrylic substrate) due to its light weight, flexibility and formability. However, acrylic is susceptible to particle (e.g. sand) and water induced erosion and crazing. Moreover, during flight, aircraft windows are subjected to differential pressures caused by the difference in pressure between the inside and the outside of the aircraft. This differential pressure causes the windows to flex and the flexing may cause the windows or any coatings on the windows to crack over a period of time. To avoid the fine cracks allowing the potential for chemicals to attack the acrylic substrate and/or allowing the coating to delaminate from the acrylic substrate, the windows are replaced in routine maintenance. This poses an additional expense and reduces the potential in-service time of the aircraft.

It might be expected that if polymeric laminates were used as windshields, then water absorption into such a windshield and corrosive effects of chemicals could lead to crazing when stress is applied to the windshield, as may be encountered in flight. Crazing or other mechanical damage, such as scratches, can have a deleterious effect on operator vision through the windshield. In addition, scratched windshield would have to be replaced routinely thereby imposing additional repair costs and reducing aircraft in-service time.

Polysiloxane coatings have been used to protect polymeric substrate surfaces from chemical attack, abrasion and wear. Polysiloxane hard coatings, applied using organosiloxane compounds, protect polymeric substrates such as polycarbonate or acrylic from damage caused by abrasion and/or environmental exposure. These solvent-based coatings, typically a few microns thick, are applied through a dip or flow coat or spray process and then dried through a low temperature (150° F.=65.5° C.) bake. As passenger aircraft windshields are stressed under airplane pressurization these polysiloxane coatings are tailored to provide good elongation properties, however, this limits their abrasion resistance. While currently available coatings, when applied to passenger aircraft windshields, exhibit good optical characteristics, their scratch resistance and durability are limited based on field results. They are either prone to cracking or they provide minimal abrasion protection. Both cracking and/or abrasion can lead to de-bonding of the polysiloxane coating due to environmental exposure and result in scratches and crazing of the base acrylic windshield substrate.

Accordingly, it is desirable to develop barrier coatings to protect polymeric substrates like passenger aircraft flight deck windshields against abrasion, chemical attack, and crazing. In addition, in the case of passenger aircraft windshields, the coatings should be reliable and have some means to warn the flight or maintenance crews when they are no longer effective. Further, in aircraft windshields, the coatings should exhibit good adhesion to the polymeric substrate, excellent wear resistance, minimal ultraviolet light-induced degradation, good elongation/flexibility, and resistance to crazing when exposed to sulfuric acid and a host of chemicals used in aircraft cleaning and maintenance, in addition it should have an indicator that shows the coating condition. Furthermore, other desirable features and characteristics of the barrier coatings will become apparent from the subsequent detailed description and the appended claims, taken in conjunction with the accompanying drawings and the foregoing technical field and background.

BRIEF SUMMARY

An exemplary embodiment provides coated polymeric substrates that have a polymeric substrate body with a coated surface. The surface coating includes more than one pair of coating layers. Each pair of coating layers includes a first applied coating layer and a second applied coating layer. In addition, an indicator, applied on top of or between coating layers, provides indicia of wear of the coating.

In another example, an embodiment of the surface coating, after exposure to chemicals selected from de-icing fluid, jet fuel, methyl ethyl ketone, solvent cleaner, alkaline cleaner, hydraulic fluid and detergent, and testing in accordance with Taber Wear Test ASTM D-1044-99 for 100 cycles, exhibits a change in haze of not more than about 1%.

In a further example, an embodiment of a method of testing a polymeric passenger aircraft windshield includes the step of examining the aircraft windshield. The windshield has a coating on an external surface and the coating includes more than one pair of coating layers. Each pair of coating layers includes a first applied coating layer and a second applied coating layer. The coating also includes an indicator, applied on top of or between coating layers that provides indicia of wear of the coating. The method further includes the step of determining, based on the indicator, whether the windshield requires maintenance, replacement or repair.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following.

Figure 1:
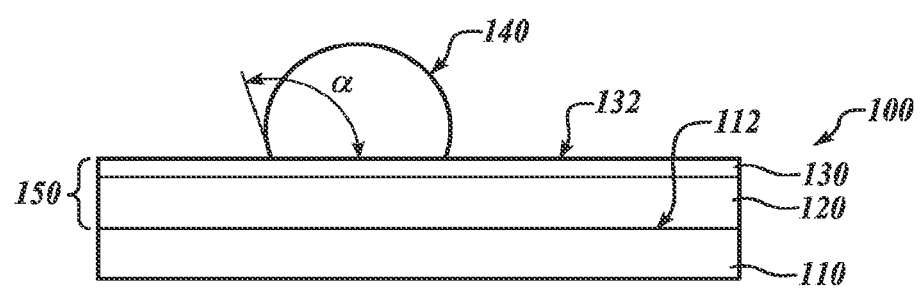
FIG. 1 is a schematic cross-sectional view, not to scale, of a portion of an exemplary embodiment of a barrier-coated polymeric substrate.

FIG. 1 illustrates an example of an embodiment of a barrier-coated polymeric substrate 100 that includes a polymeric substrate 110. In this particular embodiment, the polymeric substrate 110 includes a stretched acrylic windshield portion, and is therefore optically transparent in the wavelengths of human vision. A transparent multi-layer barrier coating ISO is applied on the surface 112 of the polymeric substrate 110. The transparent barrier coating 150 in this instance includes two transparent coating components: an underlying multi-layered coating 120 and a top indicator coating 130. The top indicator coating presents an outer coating surface 132 to the surrounding environment. Top indicator coating 130 may be selected for specific measurable physical properties of the outer coating surface 132. For example, in one exemplary embodiment the outer coating surface 132 may be hydrophobic so that a water droplet 140 on the surface 132 has a contact angle a of about 60°, or greater, as illustrated. The multi-layered coating component 120 includes multiple stacked pairs of layers (pairs of layers not shown) that are each formed and chemically bonded to each other to form the unitary multi-layered coating 120. Each pair of the multiple stacked pairs of layers includes a first layer and a second layer, as described in more detail below. The lowermost, or first formed, of the stacked pairs of layers adheres tightly to the outer surface 112 of the polymeric substrate 110.

As explained in more detail here below, examples of embodiments of barrier coatings may have any one or more of the following characteristics: good adhesion to a polymeric substrate, excellent wear resistance as measured in applicable tests, no significant UV-induced degradation due to added UV inhibitors or otherwise, and good elongation under strain. In aircraft or other windshield applications, the barrier coatings should be optically transparent and have resistance to crazing when exposed to chemicals commonly used in the processes of cleaning and maintaining the vehicle, and conditions ordinarily expected to be encountered during operations. These include, for example, deicing fluid, jet fuel, methyl ethyl ketone, solvent cleaner, alkaline cleaner, hydraulic fluid and detergent, among others. In addition, exemplary embodiments may include an indicator useful for determining barrier coating condition.

Barrier-coated polymeric substrates, whether transparent or not, may be useful in a wide range of industries and applications, for example, passenger aircraft flight deck windshields, automotive windshields and other "plastic" automobile components such as body panels, as well as other durable consumer goods such as LCD or plasma TV screens, architectural or marine windows, and even medical devices such as heart valve seats. In many instances, barrier-coated transparent polymeric substrates such as stretched acrylic or polycarbonate may be used as a substitute for glass. Such substitution may result not only in weight savings and reduced fragility, but may also result in better performance depending upon conditions of use. As detailed here below, examples of embodiments of barrier-coated polymeric substrates outperform glass in several physical tests.

In general plasma-based hard coatings exhibit low (about 1.0%) strain to failure while softer polysiloxane coatings exhibit strain of over 2%. Thus, while the plasma-based hard coatings provide durability, by themselves they lack the flexibility required for application to aircraft windows. Our prior application, "Durable Transparent Coatings for Aircraft Passenger Windows," U.S. Ser. No. 11/289,920 filed Nov. 30, 2005 is hereby fully incorporated by reference, to the extent relevant about coatings formed with a pair of coating layers. However, it has now been found that barrier coatings of acceptable hardness and ductility are achieved for aircraft windshield applications by stacking multiple pairs of hard and soft coating layers.

Exemplary embodiments of barrier coatings include more than one pair of layers. A first layer of the pair may include a coupling agent that adheres strongly to a polymeric substrate while also having functional moieties capable of bonding chemically with a second layer which will be formed over the first layer. The coupling agent may include polysiloxane, hybrid polymers of alkoxysilanes, and the like. Polysiloxanes are common organo-silicon polymers and the silane $Si(Me)_2$ is a key functional group in the synthesis of these polysiloxanes. In general, coating thickness depends on a variety of factors including, for example, the application process and the nature of the coating layer chemical composition. In exemplary embodiments, the thickness of the first applied coating layer may range from about 4 to about 5 micrometers, although thinner or thicker coatings are also useful.

A second layer of the coating may include a hard layer. Such a hard layer may be deposited by plasma techniques, such as ion beam-assisted plasma vapor deposition or plasma-enhanced chemical vapor deposition. Ion bombardment effects during deposition of silicon-based transparent coatings have been shown to improve the hardness and durability of the coatings. The second plasma-deposited coating layer bonds to the first coating layer chemically and provides a hard outer surface. Examples of hard, plasma-formed layers that may be used as the second layer include, but are not limited to, DIAMONDSHIELD™ (obtainable from Morgan Advanced Ceramics of Allentown, Pa.); transparent DYLAN™ coatings (Bekaert Advanced Coating Technologies Amherst, N.Y.); and the like, in some embodiments, the second layer may include silica, alumina, zirconia, ceria and like hard oxides. In exemplary embodiments, the second coating may be of the formulae: $SiO_xC_y$, where x ranges from 1.0 to 1.2 and y ranges from 1.0 to 0.8.

A combination of the first (softer) and second (harder) layer as a pair of coating layers is better able to resist flexing and strain than the hard layer by itself while the hard layer protects the softer from abrasion. In addition, stacked multiple pairs of layers provides significant performance improvement over a single pair of layers. Accordingly, exemplary embodiments include multiple pairs of coating layers stacked onto a first pair. The first pair has a first layer tightly adhered to the polymeric substrate surface.

In addition, exemplary embodiments may include an indicator layer applied to the uppermost (second) layer of the final pair of coating layers, or between coating layers, as may be required. For example the indicator layer may be formed between the final pair of coating layers so that it is protected by the outermost plasma-deposited hard coating layer. This indicator layer may be of a type that is readily tested for coating condition, such as physical wear from abrasion or chemical attack. If this indicator layer shows signs of wear that signal potential exposure of coating layers to the environment, then appropriate remedial action may be taken. In one embodiment, the indicator layer includes a hydrophobic layer and the degree of hydrophobicity of areas of this indicator layer may be measured to deduce the extent of wear-through of the barrier coating, if any, or any imminent risk of exposure of the underlying polymeric substrate to harsh environments or chemicals that might cause damage. In another embodiment, a metallic coating may be used. The electrical properties of this metallic layer may be correlated to coating condition. Testing any of these properties, such as resistance or conductivity, may then be used to determine barrier coating condition and whether remedial action is required.

Figure 2:
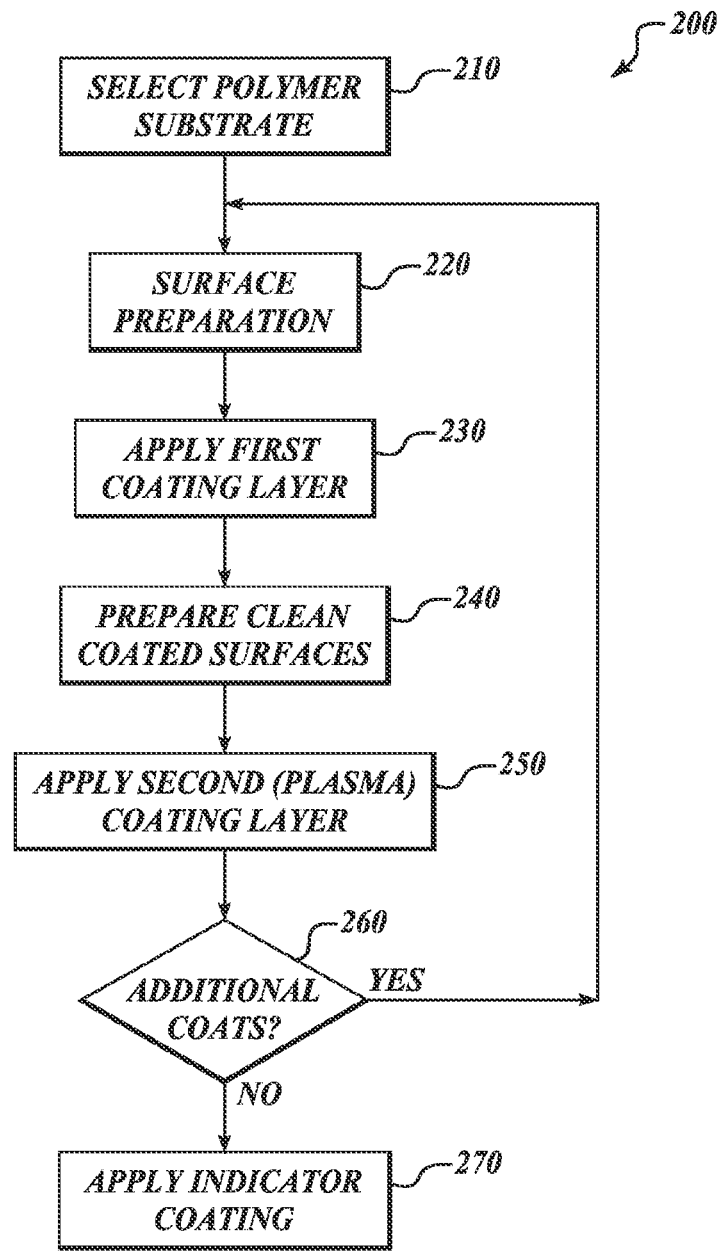
FIG. 2 is a process flow diagram of an exemplary process for producing barrier-coated polymeric substrates.

An example of a method of making barrier-coated polymer substrates 200 is shown in FIG. 2. Of course other method embodiments may have fewer or more steps. In FIG. 2, for example, a transparent stretched acrylic aircraft windshield may be selected as a polymer substrate in process 210. The stretched acrylic aircraft windshield may then be subjected to surface preparation in process 220. Surface preparation may include any suitable surface treatment based on the nature of the substrate and the surface condition. In general, for a stretched acrylic aircraft windshield, detergent and solvent cleaning as well as surface treatment with oxygen plasma may be used. After surface preparation in process 220, the cleaned, stretched acrylic windshields may be coated with a silane, such as a polysiloxane-based transparent coating composition, in process 230, to produce a first coating layer on the windshield. When the silane coating layer has hardened, the silane coated surface may be treated in process 240 to remove contaminants, such as hydrocarbons and other undesirable materials. Process 240 may include any suitable surface cleaning process, such as ultrasonic cleaning in solvents, or cleaning with aqueous detergents and/or other chemicals to prepare the surface for plasma deposition.

A second coating layer may be applied in process 250 using ion beam-assisted plasma techniques, for example, such as the plasma process used to manufacture Diamondshield™ that uses silicon-containing precursors, such as hexamethyl disiloxane and oxygen. The plasma deposition conditions, such as gas flow, deposition pressure, plasma power etc., are optimized to produce hard, transparent coatings. When desired vacuum conditions are obtained, the substrates may first be sputter cleaned using inert ions and or oxygen ions. This may then be followed by plasma deposition of the hard coat. In decision process 260, a check is conducted to see whether the desired number of multiples of pairs of coating layers has been achieved or not. If additional pairs of coatings are needed, the method returns to process step 220, as shown, and repeats processes 220 to 260 until the desired multiples of coating pairs have been applied. Then an indicator may be applied in process 270.

In another example of an embodiment of a process for producing multiple layered barrier coatings, electron beam deposition techniques may be varied to deposit pairs of coating layers that each has a hard and a softer layer. In this scheme, direct electron beam deposition produces a first, softer coating layer and ion assisted deposition creates a second, harder coating layer. Alternating between direct electron beam deposition and ion assisted processes creates a sequence of hard and softer coating layers. Layer thicknesses may be in the nanometer size range. Thus, a single layer may be from about 3 to about 10 nanometers thick so that nanostructure-induced (for example, Hall-Petch effect) mechanical strength enhancement effects may be obtained. According to the Hall-Petch relationship, mechanical strength increases as the grain size of the material decreases. This relationship holds until the grain size is the same as the equilibrium distance between dislocations in the grain structure.

In another example of an embodiment of a process for producing multiple layered barrier coatings, alternating softer and hard transparent silicon dioxide coating layers may be formed using Plasma Enhanced Chemical Vapor Deposition (PECVD) in conjunction with Electron Cyclotron Resonance (ECR) sources. The use of high density oxygen plasma generated with the in-situ ECR source reduces oxide layer growth temperature to the range from about 50° C. to about 80° C. and hence makes this technique more suitable for polymeric substrates such as acrylic and polycarbonate. The mechanical characteristics (modulus, hardness) of the deposited oxide film can be changed by varying substrate bias voltage. Accordingly, this technique may be useful to deposit alternating hard and soft coating layers in pairs to yield a multi-layer barrier-coated substrate.

In exemplary embodiments of a barrier-coated aircraft windshield, an indicator layer, such as a hydrophobic coating, is applied on top of the multi-layer barrier coating. In ordinary use, as the coated windshield is exposed to the elements and to chemicals used in aircraft cleaning and maintenance, the hydrophobic coating, which is the outermost coating, may be expected to wear out first. The wearing of this hydrophobic layer and concomitant loss of hydrophobicity at the surface indicate that the underling multi-layered coating is exposed. At that point, new hydrophobic coating can be applied. This will preserve the underlying multi-layer and maintain visibility characteristics of the aircraft windshield.

In another embodiment, the barrier coating may include an indicator layer that includes a metallic film sputtered onto the top of the multilayered coating or deposited between pairs of coating layers to provide a conductive surface. A change in electrical conductivity or other measure of electrical properties of this conductive surface would indicate a level of wear in the multilayer coat and this may be correlated with degradation of its capability to protect the substrate polymeric material. At that point, remedial action may be taken. If the metallic indicator coating is sputtered onto the multi-layer coating outer surface, the sputter coating may be renewed. If the metallic indicator coating is located between pairs of coating layers to detect when wear has reached the indicator layer depth in the coating, then the coated substrate should be taken out of service.

In an example of an embodiment of a substrate with a barrier coating that had six alternating soft and hard layers, when the coating is subjected to a sand erosion test in accordance with ASTM D968-93, the coated substrate suffered a haze change of not more than about 15%, using about 5 liters of sand of mean size 800 microns.

In another example of an embodiment of a substrate with a barrier coating that had six alternating soft and hard layers, the coated substrate demonstrated resistance to abrasive wear After exposure of the barrier coating to chemicals selected from de-icing fluid, jet fuel, methyl ethyl ketone, solvent cleaner, alkaline cleaner, hydraulic fluid and detergent, the coated substrate was tested in accordance with Taber Wear Test ASTM D1044-99 for 100 cycles. This resulted in a change in haze of not more than about 1%.

In another example of an embodiment of a substrate with a barrier coating that had six alternating soft and hard layers, when the barrier coating is subjected to a wiper abrasion durability test in accordance with D6-82942-I, it suffers a haze change of not more than about 1% after 155,000 cycles.

In another example of an embodiment of a substrate with a barrier coating that had six alternating soft and hard layers, when subjected to a three-point flex test in accordance with a modified ASTM D-790, the substrate showed no cracking or crazing after 500 cycles. Modifications to the ASTM test are shown in the Flex Test example, here below.

EXAMPLES

The following examples reflect tests conducted to compare some of the relevant physical properties of barrier-coated stretched acrylic, stretched acrylic coated with siloxane only, stretched acrylic coated with a hard plasma coating only, uncoated stretched acrylic, and glass.

To conduct these comparative tests, stretched acrylic samples of Group I were coated with a four micron thick polysiloxane coating. Stretched acrylic substrates of Group II were coated with a hard plasma coating, and stretched acrylic substrates of Group II were coated with a multi-layer that included three pairs of coating layers.

Figure 3:
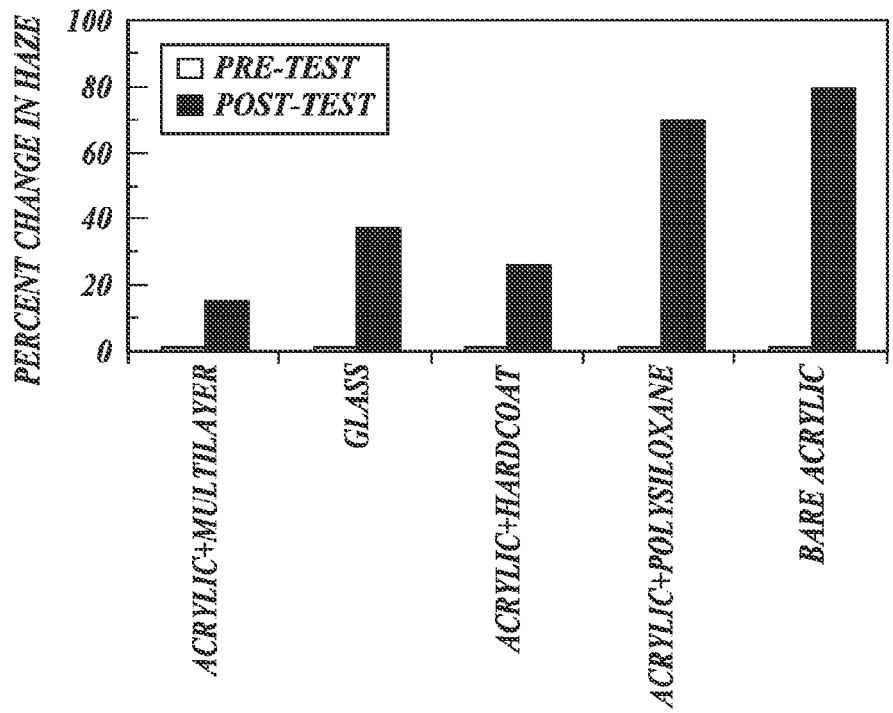
FIG. 3 is a graphical representation of comparative percent change in haze based on a Sand Erosion Test, detailed in the Examples.

Sand Erosion Test:

Samples of the coated substrates (Group I, Group II & Group III) along with bare glass and bare acrylic substrates were tested to determine the effect of sand erosion on optical haze. The tests were carried out in accordance with the procedure described in ASTM D968-93, "Standard Test methods for Abrasion Resistance of Organic Coatings by Falling Abrasive". The volume of sand used in each of these tests was five liters. The sand used in these tests had a mean diameter of 800 microns. The increase in haze was used as the criterion for measuring the severity of erosion. The results are summarized in FIG. 3. The barrier-coated sample showed the least erosion-damage. The resulting haze (15%) for this barrier-coated sample was less than half of that for a glass sample (37%).

Application of a hydrophobic coating on to sand abraded surface tends to decrease the haze further for acrylic samples. For example, haze decreased from 15% to 7% for the acrylic sample with multilayer coating after a hydrophobic coating was applied.

Figure 4:
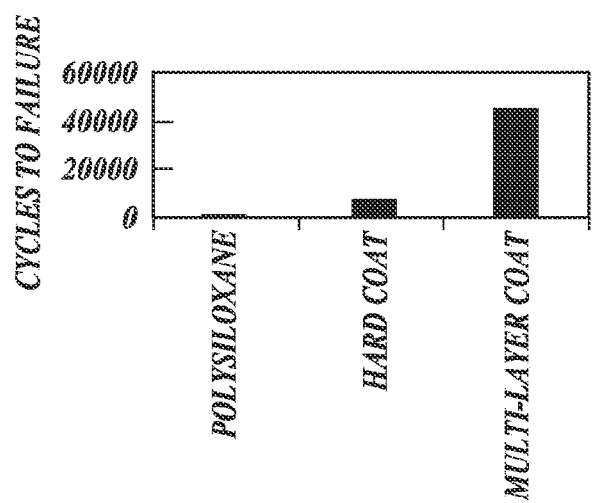
FIG. 4 is a graphical representation of comparative cycles to failure based on a Taber Wear Test, detailed in the Examples.

Taber Wear Test:

Samples were tested for wear in accordance with the procedure described in ASTM D-1044-90, "Standard Test Method for Resistance of Transparent Plastics to Surface Abrasion". This test utilizes two CS-1OF wheels that each bears a load of 500 g. The samples are laid on a table and the wheels abrade the substrate surface as the wheels rotate in a circle over the sample surfaces. Increase in haze is used as the criterion for measuring the severity of abrasion. In these tests, the samples were run and wheel rotations were counted until the haze had increased by 5% as a result of abrasion. The results are shown in FIG. 4. The barrier-coated sample showed excellent gains in wear resistance when compared to a polysiloxane or other hard coating.

Figure 5:
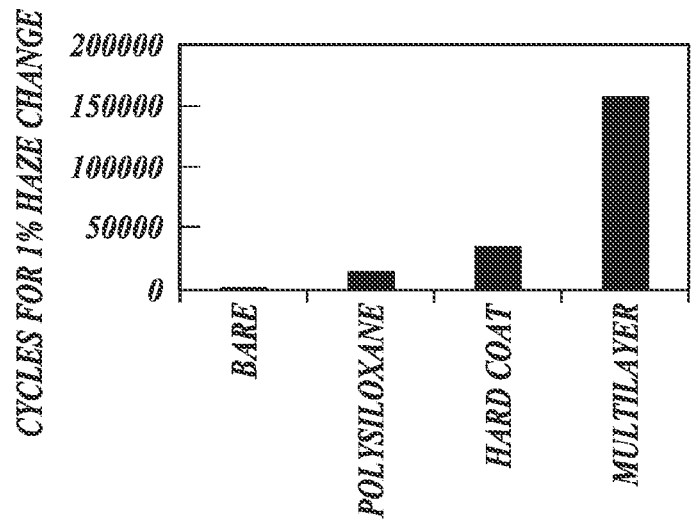
FIG. 5 is a graphical representation of comparative cycles for percent change in haze based on a Wiper Test, detailed in the Examples.

Wiper Abrasion Tests:

Coating durability tests were carried out on three groups of acrylic coupons with (1) polysiloxane and (2) a hard coat and (3) a multilayer coating in accordance with D6-82942-1, "Hydrophobic Window Coating Test Protocol." In these tests, a linear motion test apparatus that includes segments of cockpit window wiper blade in a carriage was used with an automated drive system equipped with a linear counter. The wiper blade assembly had a linear load of 0.5 lb/inch (8.937 g/mm) and wiped back and forth on the coated sample. The surface of the test sample was wet with water containing 400 mesh silicon dioxide abrasive (equivalent to medium grade Arizona road dust) to accelerate the wear of the coating. Coating durability was evaluated by measuring the number of wiper blade excursions necessary to cause a 1% change in haze of the sample. The results are summarized in FIG. 5. While the polysiloxane coating lasted only 13,000 cycles, the multilayer barrier-coated samples required 155.000 cycles to cause 1% haze change.

Figure 6:
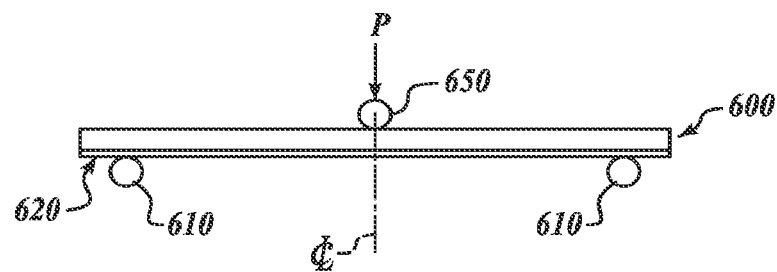
FIG. 6 is a schematic representation of apparatus used to test flexing in the Examples.
Figure 7:
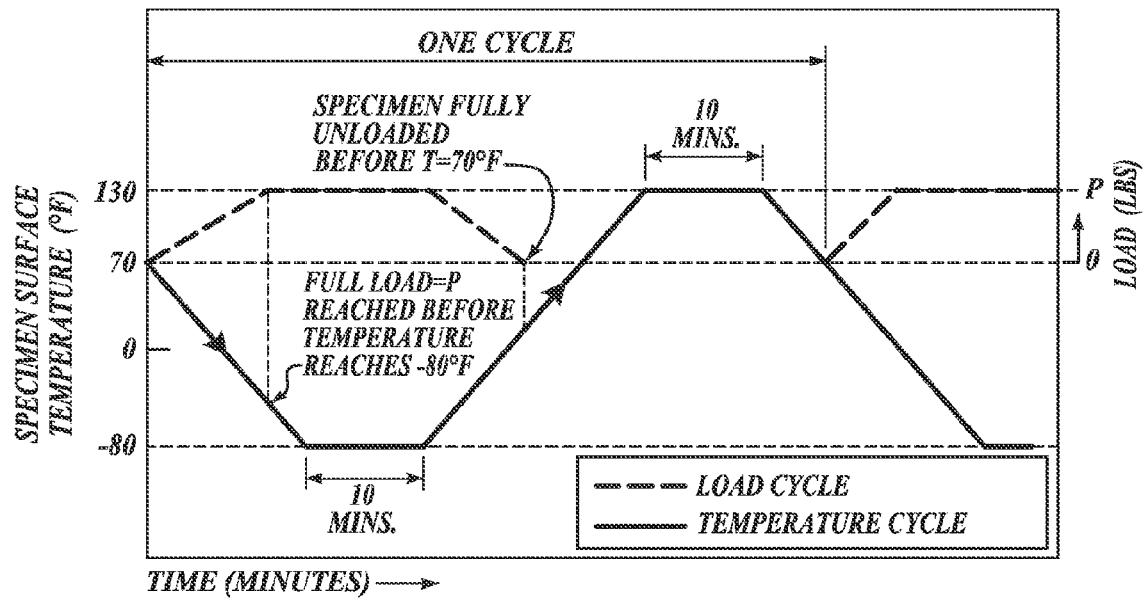
FIG. 7 is a graphic representation of load application to samples used to test flexing, as detailed in the Examples.

Flex Test:

A modified ASTM D-790 test protocol was used in conducting the flex tests of coated samples. Samples of dimensions 1"×2"×0.5" with coatings (Group I & II) were subjected to a three point bend test as shown in FIG. 6. Each sample 600 rested on supports 610 placed about 1 inch from each end of the sample. A mass 650 applied a load P in the centers of the samples 600. The hard coating side 620 faces downwards in this figure. A thin film of 75 wt. % sulfuric acid in water was applied to the coating 620 using a fiber glass filter and a Kapton tape. The test samples 600 were subjected to a cyclic load/temperature profile shown in FIG. 7. The temperature was repeatedly cycled between −80° F. and 130° F. and held constant at each of these the temperature limits for 10 minutes. As seen in FIG. 7, the samples started at 70° F. and were cooled to −80° F. over a period of about 15 minutes. The samples were then held at −80° F. for 10 minutes and reheated to 130° F. over a period of about 20 minutes. The samples were held at 130° F. for 10 minutes, then cooled to −80° F. over about 20 minutes. The cycle then repeated between −80° F. and 130° F. The load P was applied cyclically as well. Load P was zero initially and increased P=3,600 psi when temperature reached −80° F. Load was maintained at this level, and decreased to zero as the temperature increased and reached 70° F. Load increased from zero as the temperature decreased from 130 and reached 3,600 psi at 70° F. This load was maintained during the 10 minute dwell period at −80° F. and decreased in the next heating cycle, to reach zero at 70° F. The tests were continued until the coating cracked or the surface exhibited crazing (whichever occurred first). The results showed that while the polysiloxane coatings failed in 50 cycles, the multilayer barrier coatings showed no cracking or crazing even after 500 cycles.

Figure 8:
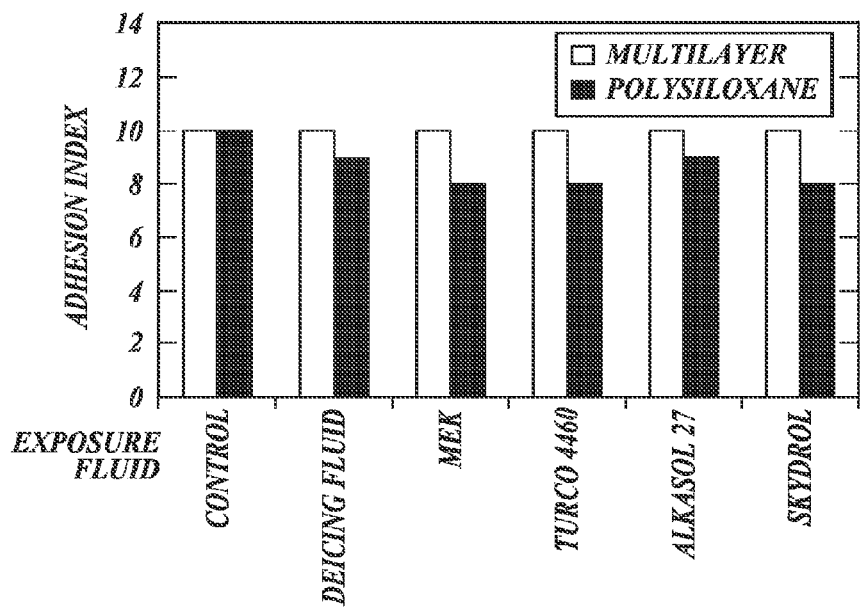
FIG. 8 is a graphical representation of comparative percent change in adhesion index based on a Dry Adhesion Test, detailed in the Examples.
Figure 9:
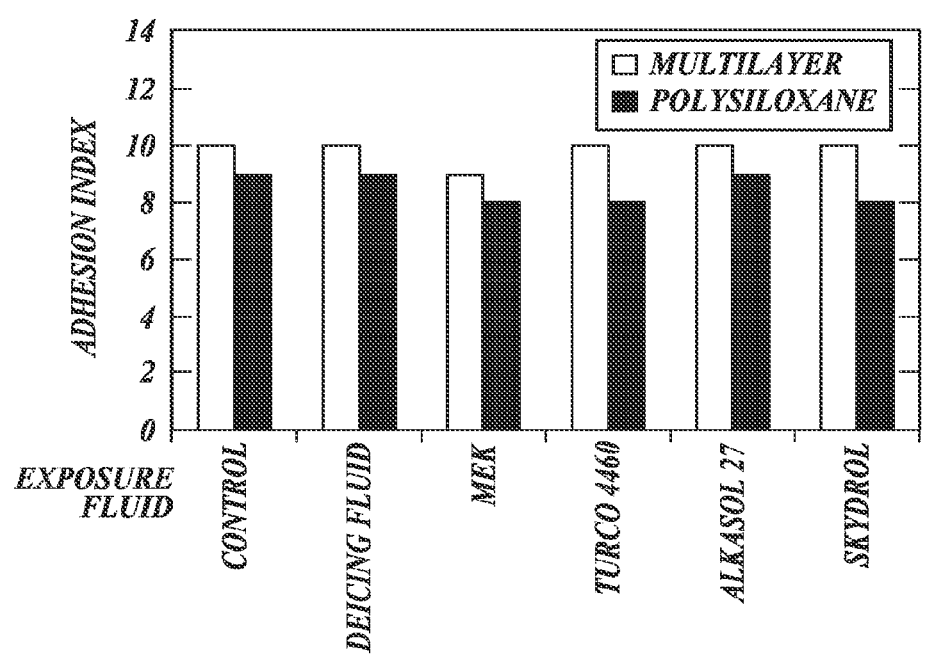
FIG. 9 is a graphical representation of comparative percent change in adhesion index based on a Wet Adhesion Test, detailed in the Examples.

Chemical Exposure Test:

Samples of stretched acrylic substrates with polysiloxane (Group I) and multilayer barrier coatings (Group II) were exposed to chemicals that are normally used in aircraft maintenance. The samples were exposed to each chemical for a period of 24 hours (exception: exposure to MEK was for 4 hours) and then tested for adhesion (modified ASTM D 3330-BSS 7225) type I and III (dry and wet)) and % haze change due to wear (ASTM D-1044-90). The samples with multilayer coatings exhibited no degradation in dry adhesion (as indicated by adhesion index) as shown in FIG. 8 or wet adhesion (as indicated by adhesion index) as shown in FIG. 9.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A coated polymeric substrate comprising:
a polymeric substrate having a first surface;
a coating on the first surface, the coating comprising:
at least one pair of coating layers comprising a first applied coating layer and a second applied coating layer;
wherein the first and second applied coating layers have a thickness between about 3 to about 10 nanometers and the second applied coating layer comprising $SiO_XC_y$ where x ranges from 1.0 to 1.2 and y ranges from 1.0 to 0.8;
wherein the coating exhibits a Hall-Petch effect.

2. The substrate of claim 1, wherein the coating includes more than one pair of coating layers, each pair comprising a first applied coating layer and a second applied coating layer.

3. The substrate of claim 1, wherein the first applied coating layer is deposited by a plasma enhanced chemical vapor deposition-applied coating layer or an electron beam deposited coating layer, the second applied coating layer harder than the first applied coating layer.

4. The substrate of claim 1, wherein the second applied coating layer comprises a plasma enhanced chemical vapor deposition-applied coating layer or an electron beam deposited coating layer or ion assisted deposition layer, the second applied coating layer harder than the first applied coating layer.

5. The substrate of claim 1, wherein the polymeric substrate body and the coating are both optically transparent in light of a wavelength region of human vision.

6. The substrate of claim 1, wherein the coating on the first surface of the polymeric substrate, when subjected to a wiper abrasion durability test in accordance with D6-82942-1, suffers a haze change of not more than about 1% after 155,000 cycles.

7. The substrate of claim 1, wherein the coating on the first surface of the polymeric substrate, when subjected to a Taber Wear Test in accordance with ASTM 1044-05, suffers a haze change of not more than about 5% after 40,000 cycles.

8. The substrate of claim 1, wherein the coating on the first surface of the polymeric substrate, when subjected to a sand erosion test in accordance with ASTM D968-93, suffers a haze change of not more than about 15%, using about 5 liters of sand of mean size 800.

9. The substrate of claim 1, wherein the coating on the first surface of the polymeric substrate, when subjected to a flex test in accordance with ASTM D-790, showed no cracking or crazing after 500 cycles.

10. The substrate of claim 1, wherein the polymeric substrate body comprises an aircraft windshield.

11. The substrate of claim 1, wherein the polymeric substrate body comprises acrylic or polycarbonate.

12. The substrate of claim 1, wherein the polymeric substrate body comprises stretched acrylic.

13. The substrate of claim 1, further comprising an indicator applied on top of or between coating layers, the indicator providing indicia of wear of the coating.

14. The substrate of claim 13, wherein the indicator comprises a metallic coating layer or a hydrophobic coating layer.

15. A polymeric substrate comprising:
a polymeric substrate body configured in a size and shape of an aircraft windshield, the polymeric substrate body having a first surface corresponding to an outer surface of the aircraft windshield;
a coating on the first surface, the coating comprising:
at least one pair of coating layers comprising a first applied coating layer and a second applied coating layer; and
an indicator applied on top of or between coating layers, the indicator providing indicia of wear of the coating;
wherein the first and second applied coating layers have a thickness between about 3 to about 10 nanometers and the second applied coating layer comprises $SiO_XC_Y$ where x ranges from 1.0 to 1.2 and y ranges from 1.0 to 0.8;
where the coating exhibits a Hall-Petch effect.

16. The polymeric substrate of claim 15, wherein more than one pair of coating layers, each pair comprising a first applied coating layer and a second applied coating layer.

17. The polymeric substrate of claim 15, wherein, after exposure of the coating to chemicals selected from de-icing fluid, jet fuel, methyl ethyl ketone, solvent cleaner, alkaline cleaner, hydraulic fluid, and detergent, testing in accordance with a Taber Wear Test ASTM D-1044-99 for 100 cycles results in a change in haze of not more than about 1%.

18. The substrate of claim 15, wherein the first applied coating layer is deposited by a plasma enhanced chemical vapor deposition-applied coating layer or an electron beam deposited coating layer, the second applied coating layer harder than the first applied coating layer.

19. The substrate of claim 15, wherein the second applied coating layer comprises a plasma enhanced chemical vapor deposition-applied coating layer or an electron beam deposited coating layer or ion assisted deposition layer, the second applied coating layer harder than the first applied coating layer.

20. The substrate of claim 15, wherein the coating, when subjected to a wiper abrasion durability test in accordance with D6-82942-1, suffers a haze change of not more than about 1% after 155,000 cycles.

21. The substrate of claim 15, wherein the coating, when subjected to a sand erosion test in accordance with ASTM D968-93, suffers a haze change of not more than about 15%, using about 5 liters of sand of mean size 800 microns.

22. The substrate of claim 15, wherein the coating on the first surface of the polymeric substrate, when subjected to a flex test in accordance with ASTM D-790, showed no cracking or crazing after 500 cycles.

\* \* \* \* \*